(12) United States Patent
Bowing

(10) Patent No.: US 12,044,161 B2
(45) Date of Patent: Jul. 23, 2024

(54) INTERNAL COMBUSTION ENGINE

(71) Applicant: INNIO Jenbacher GmbH & Co OG, Jenbach (AT)

(72) Inventor: Robert Bowing, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/796,638

(22) PCT Filed: Feb. 11, 2020

(86) PCT No.: PCT/AT2020/060041
§ 371 (c)(1),
(2) Date: Jul. 29, 2022

(87) PCT Pub. No.: WO2021/159153
PCT Pub. Date: Aug. 19, 2021

(65) Prior Publication Data
US 2023/0049218 A1   Feb. 16, 2023

(51) Int. Cl.
*F02B 19/12*   (2006.01)
*F01N 3/10*   (2006.01)
(Continued)

(52) U.S. Cl.
CPC .............. *F02B 19/12* (2013.01); *F01N 3/101* (2013.01); *F02B 19/1028* (2013.01);
(Continued)

(58) Field of Classification Search
CPC ...... F02B 19/00; F02B 19/10; F02B 19/1028; F02B 19/1057; F02B 19/12; F02B 19/16;
(Continued)

(56) References Cited

U.S. PATENT DOCUMENTS 4,041,916 A   8/1977   Iida et al.
9,920,714 B2   3/2018   Ginter et al.
(Continued)

FOREIGN PATENT DOCUMENTS

EP   3303804 B1   4/2019
JP   6123821 A   2/1986

OTHER PUBLICATIONS

PCT International Search Report and Written Opinion; Application No. PCT/AT2020/060041; dated Aug. 19, 2021; 8 pages.

*Primary Examiner* — Logan M Kraft
*Assistant Examiner* — Johnny H Hoang
(74) *Attorney, Agent, or Firm* — Fletcher Yoder, P.C.

(57) ABSTRACT

A system comprising an electronic control unit configured to provide an intake manifold of an internal combustion engine with a mixture of fuel gas, air and exhaust gas with a lambda (λ) of approximately 1 and an exhaust gas recirculation (EGR) content of about 10% to about 45%, wherein the internal combustion engine comprises a prechamber coupled to a main combustion chamber, wherein the main combustion chamber is formed in a cylinder by a piston and at least one cylinder head, wherein a source of a gas-air mixture into the prechamber comprises:
  an intake port of the main combustion chamber and a connection line between the intake port and a prechamber gas valve of the prechamber; or
  an intake manifold and a connection line between the intake manifold and the prechamber gas valve of the prechamber.

20 Claims, 2 Drawing Sheets

(51) Int. Cl.
   *F02B 19/10* (2006.01)
   *F02B 19/16* (2006.01)
   *F02M 26/00* (2016.01)
   *F02M 35/10* (2006.01)
   *F02M 35/104* (2006.01)

(52) U.S. Cl.
   CPC .......... *F02B 19/1057* (2013.01); *F02B 19/16* (2013.01); *F02M 26/00* (2016.02); *F02M 35/10157* (2013.01); *F02M 35/10222* (2013.01); *F02M 35/10262* (2013.01); *F02M 35/104* (2013.01)

(58) Field of Classification Search
   CPC ......... F02B 47/00; F02B 51/00; F02M 25/03; F02M 26/00; F02M 26/35; F02M 27/04; F01N 3/10; F01N 3/101
   See application file for complete search history.

(56) References Cited

U.S. PATENT DOCUMENTS

| | | |
|---|---|---|
| 10,323,566 B2 | 6/2019 | Fuchs |
| 10,598,136 B2 * | 3/2020 | Naruse ................ F01N 11/002 |
| 2008/0022680 A1 * | 1/2008 | Gingrich ............... F02M 26/05 |
| | | 60/605.2 |
| 2020/0158005 A1 * | 5/2020 | Singh .................... F02M 25/08 |

* cited by examiner

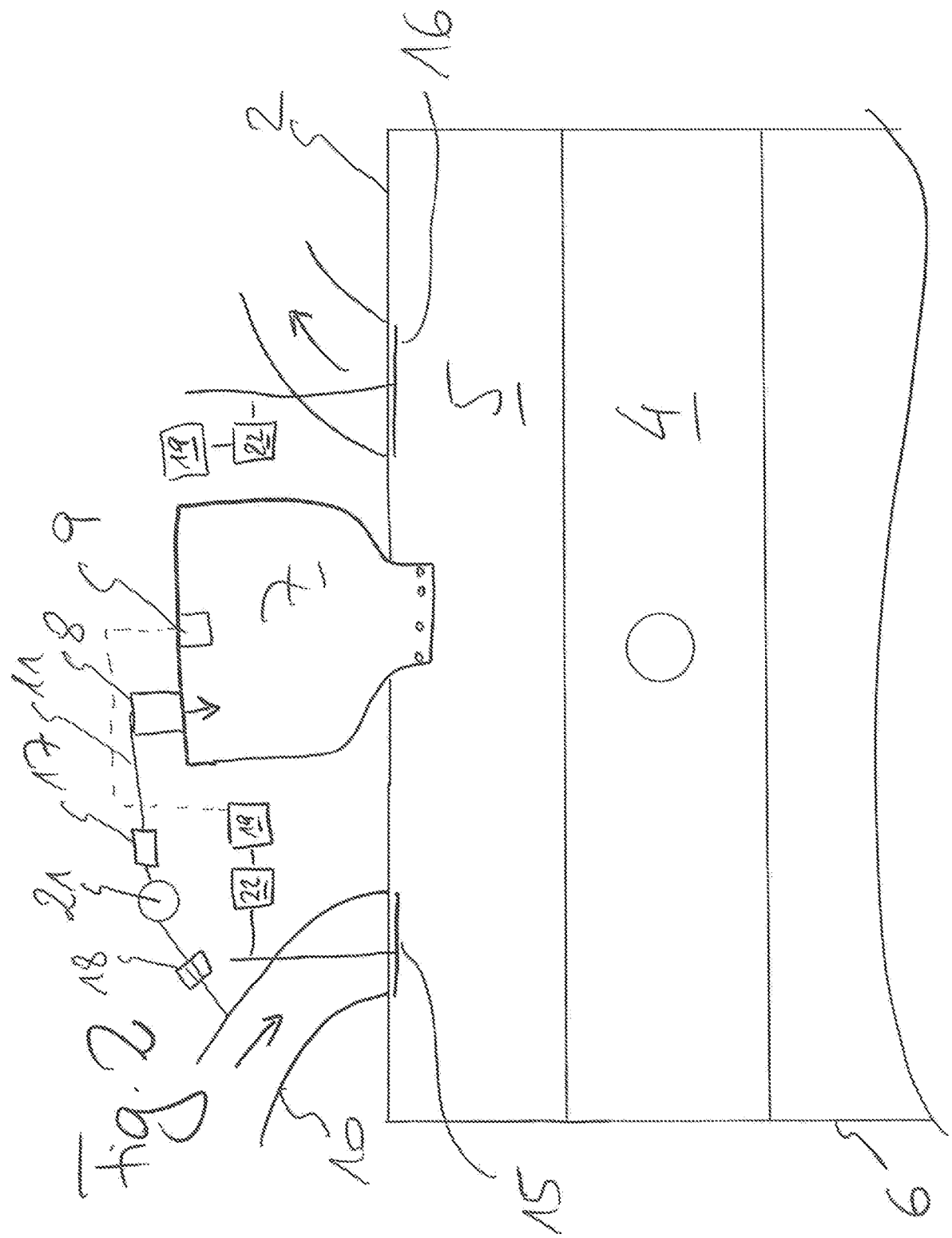

INTERNAL COMBUSTION ENGINE

CROSS-REFERENCE TO RELATED APPLICATION

This application is a National Stage entry from, and claims benefit of, PCT Application No. PCT/AT2020/060041, filed on Feb. 11, 2020; entitled "INTERNAL COMBUSTION ENGINE", which is herein incorporated by reference in its entirety.

BACKGROUND

The invention concerns an internal combustion engine having prechambers of the fuel-gas-air-mixture flushed type.

Parameter $\lambda$ characterizes a mixture of air and fuel gas with $\lambda=1$ denoting a stoichiometric mixture, $\lambda>1$ denoting a lean mixture, and $\lambda<1$ denoting a rich mixture.

The term "fuel gas" can encompass fuel gas such as natural gas, biogas, landfill gas, sewage gas etc.

In internal gas combustion engines having cylinder diameters below 180 mm, direct ignition is prevalent. A gas-air mixture present inside the main combustion chamber is ignited by a spark plug protruding into the main combustion chamber. Together with the concept of lean operation (use of a gas-air mixture with $\lambda>1$), a NOx fraction of the exhaust gas produced during operation can be held below legally proscribed values. It is also known to dilute a stoichiometric gas-air mixture with exhaust gas instead of additional air, such that the gas-air mixture has a $\lambda$ about 1 and an exhaust gas fraction is present. The advantage of this measure is the fact that a three-way-catalysator can be utilized and emission of pollutants by the internal combustion engine can be massively reduced.

In internal gas combustion engines having cylinder diameters above 180 mm, the concept of a gas-flushed prechamber is used wherein the main combustion chambers are provided with a lean gas-air mixture and pure gas is provided to the prechambers via prechamber gas valves. During a compression stroke, a lean gas-air mixture is pressed from the main combustion chamber into the prechamber to form a gas-air mixture as the prechamber charge with $\lambda$ about 1 at the time of ignition. The prechamber charge is ignited by an ignition source (e.g., a spark plug) and ignition torches protruding from the prechamber into the main combustion chamber ignite the lean gas-air mixture present in the main combustion chamber.

The concept of a gas-flushed prechamber can be used together with a lean operation concept, but not together with an operation concept where a stoichiometric gas-air mixture is diluted with exhaust gas, since in the latter concept a very rich gas-air mixture (with a high exhaust gas fraction) is formed in the prechamber and there is not enough oxygen in the prechamber to guarantee a successful and fast ignition of the resulting gas-air-exhaust gas mixture.

EP 3 303 804 B1 discloses an internal combustion engine having the following features:
- at least one cylinder head;
- an intake manifold;
- a plurality of piston-cylinder-units in which pistons are movably arranged;
- a plurality of main combustion chambers, wherein each main combustion chamber is formed in a cylinder by a piston and at least one cylinder head;
- a plurality of intake ports wherein each intake port is connected to one of the main combustion chambers and to an intake manifold;
- a plurality of prechambers wherein each prechamber is connected to one of the main combustion chambers and is provided with a prechamber gas valve, an ignition device and a source for a gas-air mixture which is formed by the intake port of the main combustion chamber to which the prechamber is connected and a connection line provided between the intake port and the prechamber gas valve;
- an electronic control unit configured to control a lambda $\lambda$ of the gas-air mixture provided to the intake ports or the intake manifold EP 3 303 804 B1 discloses an operation concept in which the prechambers are flushed not with pure gas but with a mixture of air and fuel gas taken from an intake port of the main combustion chamber to which a prechamber is coupled. A very lean prechamber charge with a $\lambda$ greater than 1.2 or even greater than 1.7 is formed resulting in low NOx emissions.

BRIEF DESCRIPTION

An embodiment of the invention provides an internal combustion engine having prechambers of the fuel-gas-air-mixture flushed type with reduced pollutant emissions.

The foregoing embodiment of the internal combustion engine is described in detail below and as set forth in the claims.

As is well known in the art, stoichiometric mixture of air and fuel gas can be diluted with additional air or with recirculated (cooled) exhaust gas in order to reduce the combustion knocking tendency, and thus to increase the maximum specific power output of the engine. The dilution by additional air will result in lean burn combustion. However, the dilution with exhaust gas will not change the air-fuel ratio (which will stay at $\lambda=1$) and therefore enable the usage of a three-way-catalyst for pollutant reduction.

The exhaust gas recirculation rate (EGR rate) of the mixture of air, fuel gas and exhaust gas in the intake manifold (in percent) is defined by the formula $$x_{EGR}[\%] = m_{EGR}/m_{tot} \cdot 100$$

with $m_{EGR}$ denoting mass of the recirculated exhaust gas and $m_{tot}$ denoting total mass of the mixture of air, fuel gas and recirculated exhaust gas.

An internal combustion engine according to an embodiment has:
- at least one cylinder head;
- an intake manifold;
- a plurality of piston-cylinder-units in which pistons are movably arranged;
- a plurality of main combustion chambers, wherein each main combustion chamber is formed in a cylinder by a piston and the at least one cylinder head;
- a plurality of intake ports wherein each intake port is connected to one of the main combustion chambers and to an intake manifold;
- a plurality of prechambers, wherein each prechamber is connected to one of the main combustion chambers and is provided with a prechamber gas valve, an ignition device (the ignition timing of which can be controlled by an electronic control unit), and a source for a gas-air mixture which is formed by:
  - the intake port of the main combustion chamber to which the prechamber is connected and a connection line provided between the intake port and the prechamber gas valve;

or
the intake manifold and a connection line provided between the intake manifold and the prechamber gas valve;
an external exhaust gas re-circulation to the intake manifold;
an electronic control unit configured to provide the intake manifold with a mixture of fuel gas, air and exhaust gas with:
a lambda λ of approximately 1; and
an exhaust gas recirculation (EGR) content of about 10% to about 45%.

According to an embodiment of the invention, a stoichiometric gas-air mixture is diluted with re-circulated exhaust gas to form an ignitable mixture that is supplied to a prechamber via the prechamber gas valve and to the main chamber via the intake valves. The use of a stoichiometric mixture fuel gas, air and exhaust gas allows the use of a three-way-catalysator in an exhaust pipe (usually downstream of a turbine of a turbocharger if one is provided) of the internal combustion engine to decrease emission of pollutants.

The parameter lambda λ of the gas-air mixture in the intake manifold and the intake ports and therefore of the gas-air mixture provided to the main combustion chamber and the prechambers via the intake valves and the prechamber gas valves (which can be preferably passive valves, e.g., check valves) can be adjusted in the usual manner, e.g., by adding more or less fuel gas to the intake air in a mixing device.

The EGR content $x_{EGR}$ of the mixture of air, fuel gas and exhaust gas in the intake manifold and the intake ports can be adjusted by an external exhaust gas re-circulation in the usual manner, e.g., by adding more or less recirculated exhaust gas to the air or the air-fuel mixture in an EGR mixing device.

The ignition device can be in the form of a spark plug.

In a preferred embodiment of the invention, there is at least one turbocharger to provide pressurized mixture (air-EGR or air-fuel gas-EGR) to the intake manifold. In this embodiment, it is provided for that the connection lines to the prechamber branch off from the intake manifold or the intake ports between the turbocharger and inlet valves of the main combustion chambers.

In a preferred embodiment of the invention, the electronic control unit is configured to provide the intake ports with a gas-air mixture with a lambda λ between about 0.95 and about 1.05.

In a preferred embodiment of the invention, the electronic control unit is configured to provide recirculated exhaust gas to the main chambers and prechambers, such that the EGR content is between about 10% and about 45%.

It can be provided that the fuel gas is supplied either by means of a gas mixer upstream of the compressor of the turbocharger or by means of port fuel injection valves positioned downstream of the compressor of the turbocharger.

In a preferred embodiment of the invention, the recirculated exhaust gas is provided to the main chambers and prechambers by an EGR system that connects the exhaust system to the intake system via an EGR mixing device, which can be controlled by the electronic control unit via an EGT control device.

It can be provided that inlet and outlet valves of the main combustion chambers are actuated by an actuator, which is controlled by the electronic control unit such that an inlet valve closes before the piston reaches a lower dead center position. This ensures the complete flushing of the prechambers through the still retracting pistons. However, it is preferred that this motion of the inlet and outlet valves is controlled not electronically but by a camshaft.

In a preferred embodiment of the invention, a three-way-catalyst is arranged in an exhaust pipe of the internal combustion engine (usually downstream of the turbine of a turbocharger, if one is provided).

In a preferred embodiment of the invention, a ratio of a volume of a prechamber to a compression volume of the main combustion chamber to which the prechamber is connected in an upper dead center of a piston movement ranges from about 0.5%-about 4%.

In a preferred embodiment of the invention, the connection lines are formed as cavities in the cylinder head.

A tempering device can be provided for each connection line in order to prevent condensation of the gas-air mixture provided to the prechambers.

An optional aperture can be provided for each connection line in order to decouple the prechambers from pressure pulsations in the intake ports.

The present invention can be used irrespective of a piston shape, e.g., in connection with flat pistons or pistons with bowls.

The internal combustion engine is preferably formed as a stationary gas motor, which preferably is coupled to an electrical generator to generate electrical power or to a drive shaft to generate mechanical power (e.g., to drive a compressor).

BRIEF DESCRIPTION OF THE DRAWINGS

An embodiment of the invention is shown in FIGS. 1 and 2.

FIG. 2 shows a single piston-cylinder-unit 3 of the internal combustion engine 1 of FIG. 1.

DETAILED DESCRIPTION

Figure 1:
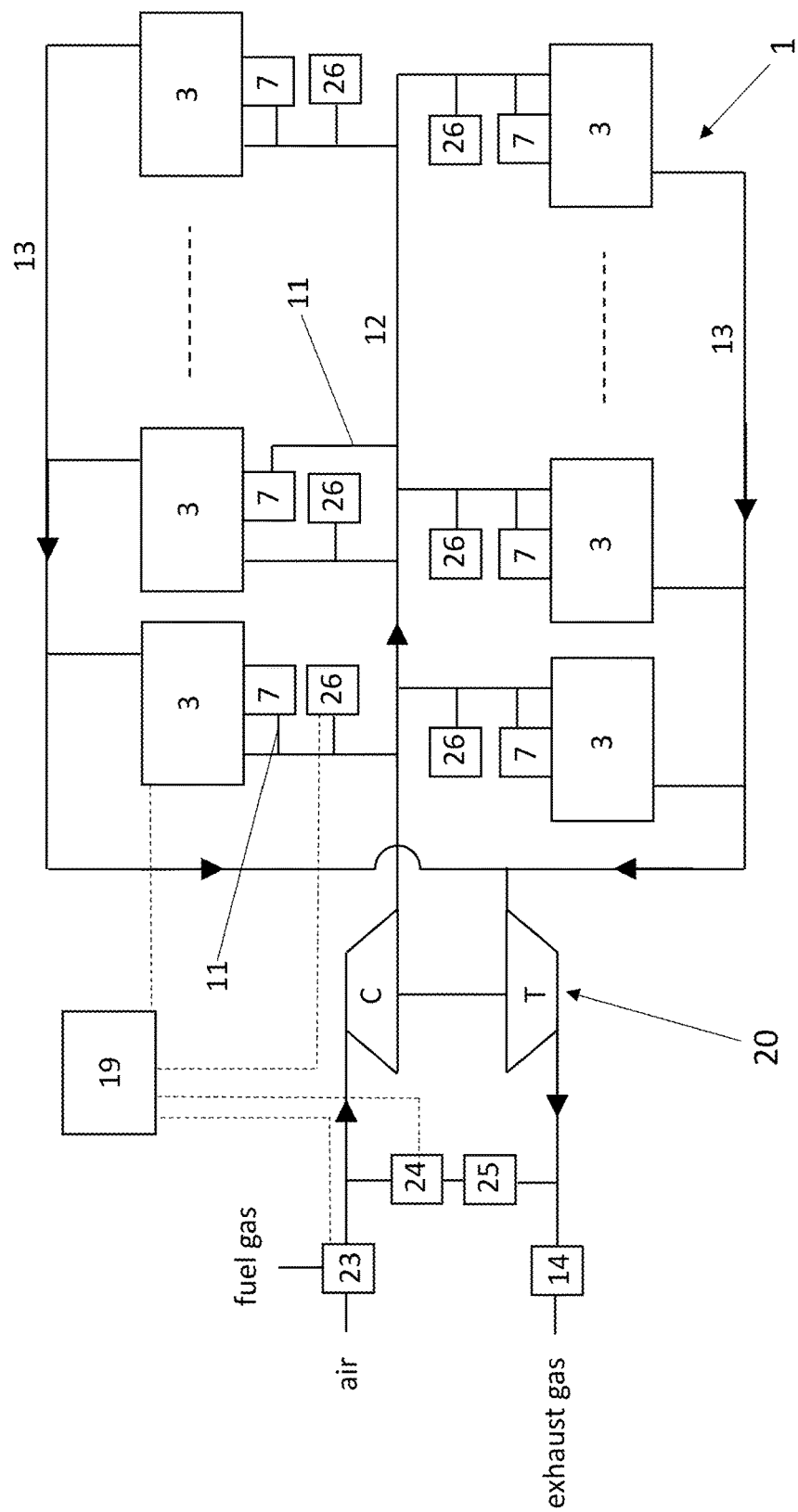
FIG. 1 shows an internal combustion engine 1 according to an embodiment of the invention.

The internal combustion engine has a cylinder head 2 (in reality two cylinder heads 2 in V configuration, but only one is shown), a plurality of piston-cylinder-units 3 in which pistons 4 are movably arranged and a plurality of main combustion chambers 5, wherein each main combustion chamber 5 is formed in a cylinder 6 by a piston 4 (cf. FIG. 2) and the cylinder head 2.

A plurality of intake ports 10 is provided, wherein each intake port 10 is connected to one of the main combustion chambers 5.

A plurality of prechambers 7 is provided, wherein each prechamber 7 is connected to one of the main combustion chambers 5 and is provided with a prechamber gas valve 8, an ignition device 9 (the ignition timing of which can be controlled by an electronic control unit 19), and a source for a mixture of fuel gas, air and exhaust gas.

The source for a mixture of fuel gas, air and exhaust gas is formed by the intake port 10 of the main combustion chamber 5 to which the prechamber 7 is connected (shown as an example for all of the prechambers 7 but one) or the intake manifold 12 (shown as an example with respect to the prechamber 7 which is situated second from left in the upper region of FIG. 1), and a connection line 11 provided between the intake port 10 or the intake manifold 12 and the prechamber gas valve 9. Of course, other than shown in FIG.

1, it will be preferred to connect the connection lines 11 of all prechambers 7 either to the intake port 10 or the intake manifold 12.

In FIG. 1, a mixing device 23 for air and fuel gas and port fuel injection valves 26 are shown together. It is of course preferred to use either a mixing device 23 or port fuel injection valves 26.

The electronic control unit 19 (dashed command lines are shown only with respect to a single piston-cylinder-unit 3, but are of course provided with respect to all of them) is configured to provide the intake manifold 12 with a mixture of fuel gas, air and exhaust gas via a fuel gas-air mixing device 23 with a lambda λ of at approximately 1 and via an external exhaust gas re-circulation (external EGR) mixing device (having an EGR control device 24 controlled by the electronic control unit 19 and an EGR cooler 25) with $x_{EGR}$ of approximately 10% to 45%.

The main chamber and prechamber charge is controlled to have a lambda λ of approximately 1 (preferably between about 0.95 and about 1.05) and a recirculated exhaust gas content $x_{EGR}$ of about 10% to about 45%, preferably between about 10% and about 45%, more preferably about 15% and 40%.

If a turbocharger 20 is provided, exhaust gas is provided upstream of a compressor C of the turbocharger 20.

In this embodiment, the internal combustion engine 1 is provided with at least one turbocharger 20 (having a compressor C and a turbine T) to provide pressurized mixture (air-EGR or air-fuel gas-EGR) to the intake manifold 12. The connection lines 11 branch off from the intake manifold 12 or the intake ports 10 between the turbocharger 20 and inlet valves 15 of the main combustion chambers 5.

Inlet and outlet valves 15, 16 of the main combustion chambers 5 are actuated by an actuator 22 (which might optionally be controlled by the electronic control unit 19), such that an inlet valve 15 closes before the piston 4 reaches a lower dead center position. It is however preferred to control this motion of the inlet and outlet valves 15, 16 without the electronic control unit 19 via a camshaft.

A three-way-catalysator (catalytic converter) 14 is arranged preferably downstream of the turbocharger turbine T.

As an example, a ratio of a volume of a prechamber 7 to a compression volume of the main combustion chamber 5 to which the prechamber 7 is connected in an upper dead center of a piston movement ranges from about 0.5%-about 4%.

As an example, the connection lines 11 are formed as cavities in the cylinder head 2.

A tempering device 17 and a throttle 21 can be provided for each connection line 11.

An aperture 18 can be provided for each connection line 11 in order to decouple the prechambers 7 from pressure pulsations in the intake ports 10 or the intake manifold 12.

LIST OF REFERENCE NUMBERS 1 internal combustion engine
2 cylinder head
3 piston-cylinder-unit
4 piston
5 main-combustion chamber
6 cylinder
7 prechamber
8 gas valve
9 ignition device
10 intake port
11 connection line
12 intake manifold
13 exhaust manifold
14 three-way-catalysator
15 inlet valve
16 outlet valve
17 tempering device
18 aperture
19 electronic control unit
20 turbocharger
21 throttle
22 actuator
23 mixing device
24 EGR control device of external exhaust gas re-circulation
25 EGR cooler of external exhaust gas re-circulation
26 port fuel injection valve
C compressor of turbocharger
T turbine of turbocharger

The invention claimed is:

1. An internal combustion engine, comprising:
at least one cylinder head;
an intake manifold;
a plurality of main combustion chambers, wherein each of the plurality of main combustion chambers is formed in a cylinder by a piston and the at least one cylinder head;
a plurality of intake ports, wherein each of the plurality of intake ports is connected to one of the plurality of main combustion chambers and to the intake manifold;
a plurality of prechambers, wherein each of the plurality of prechambers is connected to one of the plurality of main combustion chambers and comprises a prechamber gas valve, an ignition device, and a source for a gas-air mixture, wherein the source comprises:
the intake port of the main combustion chamber coupled to the respective prechamber and a connection line between the intake port and the prechamber gas valve of the respective prechamber; or
the intake manifold and a connection line between the intake manifold and the prechamber gas valve of the respective prechamber;
an exhaust gas re-circulation line coupled to the intake manifold;
an electronic control unit configured to provide the intake manifold with a mixture of fuel gas, air, and exhaust gas with a lambda (λ) of approximately 1 and an exhaust gas recirculation (EGR) content $\chi_{EGR}$ of about 10% to about 45%, wherein the mixture is present in each of the plurality of main combustion chambers and each of the plurality of prechambers as an ignitable mixture at a time of ignition.

2. The engine of claim 1, wherein the electronic control unit is configured to provide the intake manifold with the mixture with the lambda (λ) of between about 0.95 and about 1.05.

3. The engine of claim 1, wherein the electronic control unit is configured to provide recirculated exhaust gas to the intake manifold such that the EGR content $\chi_{EGR}$ is between about 15% and about 40%.

4. The engine of claim 1, wherein the fuel gas is supplied by a gas mixer upstream of a compressor of a turbocharger or port fuel injection valves positioned downstream of the compressor of the turbocharger.

5. The engine of claim 1, comprising at least one turbocharger configured to provide a pressurized mixture of the air, the fuel gas, and the exhaust gas or a pressurized mixture of the air and the exhaust gas to the intake manifold, wherein the connection lines branch off from the plurality of intake ports or the intake manifold between the at least one turbocharger and inlet valves of the plurality of main combustion chambers.

6. The engine of claim 1, wherein diameters of the cylinders are above 140 mm.

7. The engine of claim 1, wherein inlet and outlet valves of the plurality of main combustion chambers are actuated by a camshaft or an actuator controlled by the electronic control unit such that an inlet valve closes before the piston reaches a lower dead center position.

8. The engine of claim 1, comprising a three-way catalytic converter arranged in an exhaust pipe of the internal combustion engine downstream or upstream of a turbine of a turbocharger.

9. The engine of claim 1, wherein a ratio of a volume of a prechamber of the plurality of prechambers to a compression volume of a respective main combustion chamber of the plurality of main combustion chambers to which the prechamber is connected in an upper dead center of a piston movement ranges from about 0.5% to about 4%.

10. The engine of claim 1, wherein the connection lines are formed as cavities in the at least one cylinder head.

11. The engine of claim 1, wherein a tempering device is provided for each connection line, and the tempering device is configured to inhibit condensation of the mixture.

12. The engine of claim 1, wherein an aperture is provided for each connection line to decouple the plurality of prechambers from pressure pulsations in the plurality of intake ports.

13. The engine of claim 1, wherein the prechamber gas valve of each of the plurality of prechambers comprises a check valve.

14. The engine of claim 1, wherein the mixture is supplied to each of the plurality of prechambers via the prechamber gas valve and to each of the plurality of main combustion chambers via an inlet valve.

15. A system, comprising:
an electronic control unit configured to provide an intake manifold of an internal combustion engine with a mixture of fuel gas, air, and exhaust gas with a lambda (λ) of approximately 1 and an exhaust gas recirculation (EGR) content $\chi_{EGR}$ of about 10% to about 45%, wherein the internal combustion engine comprises a prechamber coupled to a main combustion chamber, wherein the main combustion chamber is formed in a cylinder by a piston and at least one cylinder head, wherein the mixture is present in the main combustion chamber and the prechamber as an ignitable mixture at a time of ignition, wherein a source of a gas-air mixture into the prechamber comprises:
an intake port of the main combustion chamber and a connection line between the intake port and a prechamber gas valve of the prechamber; or
the intake manifold and a connection line between the intake manifold and the prechamber gas valve of the prechamber.

16. The system of claim 15, wherein the electronic control unit is configured to provide the intake manifold with the mixture with the lambda (λ) of between about 0.95 and about 1.05.

17. The system of claim 15, wherein the electronic control unit is configured to provide recirculated exhaust gas to the intake manifold such that the EGR content $\chi_{EGR}$ is between about 15% and about 40%.

18. The system of claim 15, comprising the internal combustion engine coupled to a generator, wherein the mixture is supplied to the prechamber via the prechamber gas valve and to the main combustion chamber via an inlet valve.

19. A method, comprising:
providing, via control by an electronic control unit, an intake manifold of an internal combustion engine with a mixture of fuel gas, air, and exhaust gas with a lambda (λ) of approximately 1 and an exhaust gas recirculation (EGR) content $\chi_{EGR}$ of about 10% to about 45%, wherein the internal combustion engine comprises a prechamber coupled to a main combustion chamber, wherein the main combustion chamber is formed in a cylinder by a piston and at least one cylinder head, wherein the mixture is present in the main combustion chamber and the prechamber as an ignitable mixture at a time of ignition, wherein a source of a gas-air mixture into the prechamber comprises:
an intake port of the main combustion chamber and a connection line between the intake port and a prechamber gas valve of the prechamber; or
the intake manifold and a connection line between the intake manifold and the prechamber gas valve of the prechamber.

20. The method of claim 19, wherein the lambda (λ) is between about 0.95 and about 1.05, the EGR content $\chi_{EGR}$ is between about 15% and about 40%, the mixture is supplied to the prechamber via the prechamber gas valve and to the main combustion chamber via an inlet valve, and a 3-way catalytic converter is coupled to an exhaust pipe downstream from the internal combustion engine.

* * * * *